United States Patent
Genschorek

(10) Patent No.: US 6,370,828 B1
(45) Date of Patent: Apr. 16, 2002

(54) MOUNTING SYSTEM FOR SOLAR PANEL

(75) Inventor: Gido Genschorek, Dahlewitz (DE)

(73) Assignee: Regen Energiesysteme GmbH, Dahlewitz (DE)

( * ) Notice: Subject to any disclaimer, the term of this patent is extended or adjusted under 35 U.S.C. 154(b) by 0 days.

(21) Appl. No.: 09/618,441

(22) Filed: Jul. 18, 2000

(30) Foreign Application Priority Data

Jul. 19, 1999 (DE) ............................ 199 34 073

(51) Int. Cl.[7] ................................. E04B 7/18
(52) U.S. Cl. ............. 52/200; 52/173.3; 52/204.53; 52/204.71; 52/460
(58) Field of Search ................. 52/173.3, 460, 52/489.1, 483.1, 168, 200, 204.53, 204.71, 204.5

(56) References Cited

U.S. PATENT DOCUMENTS

| | | | | |
|---|---|---|---|---|
| 3,937,208 A | * | 2/1976 | Katz et al. ............ | 126/270 |
| 4,006,731 A | | 2/1977 | Carroll | |
| 4,426,999 A | * | 1/1984 | Evans et al. ............ | 126/450 |
| 5,299,396 A | * | 4/1994 | Raap et al. ............ | 52/90.1 |
| 5,682,713 A | * | 11/1997 | Weiss ............ | 52/200 |

FOREIGN PATENT DOCUMENTS

| | | |
|---|---|---|
| DE | 3007947 | 11/1980 |
| DE | 295 21 277 | 12/1996 |
| EP | 0618411 | 10/1994 |

* cited by examiner

*Primary Examiner*—Carl D. Friedman
*Assistant Examiner*—Yvonne M Horton
(74) *Attorney, Agent, or Firm*—Herbert Dubno; Andrew Wilford

(57) ABSTRACT

An elongated roof profile and a solar panel having a profiled edge molding are secured together by a separate retaining profile between the edge molding and roof profile and having formations engaging the roof profile and preventing movement of the retaining profile relative thereto generally parallel to a plane of the panel, formations engaging the roof profile and preventing movement of the retaining profile relative thereto transverse to the plane, formations engaging the edge molding and preventing movement of the retaining profile relative thereto generally parallel to the plane, and formations engaging the edge molding and preventing movement of the retaining profile relative thereto transverse to the plane.

7 Claims, 5 Drawing Sheets

MOUNTING SYSTEM FOR SOLAR PANEL

FIELD OF THE INVENTION

The present invention relates to a solar panel. More particularly this invention concerns a system for mounting a solar panel on a roof.

BACKGROUND OF THE INVENTION

A standard solar panel is rectangular and planar with four straight edges. A profiled molding running along the edges and typically of C-section opens downward perpendicular to the plane of the panel. The panel is mounted in place by screwing this edge molding directly to appropriate mounting strips secured to the roof. Driving the screws accurately is hard and it is often difficult to get access to set the necessary screws, especially when panels are mounted in close juxtaposition to one another.

OBJECTS OF THE INVENTION

It is therefore an object of the present invention to provide an improved mounting system for a solar panel.

Another object is the provision of such an improved mounting system for a solar panel which overcomes the above-given disadvantages, that is which makes it very easy to solidly mount the panel in place, even immediately adjacent another such panel.

SUMMARY OF THE INVENTION

An elongated roof profile and a solar panel having a profiled edge molding are secured together according to the invention by a separate mounting profile between the edge molding and roof profile and having formations engaging the roof profile and preventing movement of the mounting profile relative thereto generally parallel to a plane of the panel, formations engaging the roof profile and preventing movement of the mounting profile relative thereto transverse to the plane, formations engaging the edge molding and preventing movement of the mounting profile relative thereto generally parallel to the plane, and formations engaging the edge molding and preventing movement of the mounting profile relative thereto transverse to the plane.

Thus according to the invention the mounting profile, which can extend the full length of an edge of the panel or only along a portion of this length, serves for holding the panel to the roof profile, eliminating the need for complex fasteners or screws. The mounting profiles can be mounted on the roof profiles in advance, or can be installed right in the field.

The roof profile in accordance with the invention has at least one elongated arm transverse to the plane, having a upper edge provided with a short lip extending generally parallel to the frame, and engaged between the formations preventing movement of the mounting profile relative to the roof profile generally parallel to the plane. In addition the formations preventing movement of the mounting profile relative to the roof profile generally parallel to the plane include a pair of arms projecting downward from the mounting profile and embracing the one arm of the roof profile. More particularly the formations preventing movement of the mounting profile relative to the roof profile transverse to the plane include a tab projecting from one of the mounting-profile arms and engaging underneath the lip of the roof-profile arm.

The edge molding in accordance with the invention has at least one elongated leg transverse to the plane, having a lower edge provided with a short lip extending generally parallel to the frame, and engaged with at least one of the formations preventing movement of the mounting profile relative to the edge molding generally parallel to the plane. The formations preventing movement of the mounting profile relative to the edge molding generally parallel to the plane include a pair of parallel and upwardly directed arms at least one of which engages the edge-molding leg. One of the mounting-profile arms is formed with a lip directed generally parallel to the plane, engaged behind the lip of the edge-molding leg, and constituting the formation preventing movement of the mounting profile relative to the edge molding transverse to the plane. More specifically the formations preventing movement of the mounting profile relative to the edge molding generally parallel to the plane include a pair of parallel and upwardly directed arms flanking and capturing the edge-molding leg.

In another system, the edge molding has another such elongated leg transverse to the plane, having a lower edge provided with a short lip extending generally parallel to the frame, and engaged with the formations preventing movement of the mounting profile relative to the edge molding transverse to the plane.

The mounting profile can be formed with an elastically deflectable elongated rib extending transverse to the plane and having an outer edge formed with a barb engaged behind one of the lips of the edge molding and constituting the formation preventing movement of the mounting profile relative to the edge molding transverse to the plane. In another system the edge molding is of C-section, open inwardly parallel to the plane, and has a lower arm extending parallel to the plane and engaged with the formations of the mounting profile preventing movement of the mounting profile relative to the edge molding both transversely and generally parallel to the plane.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
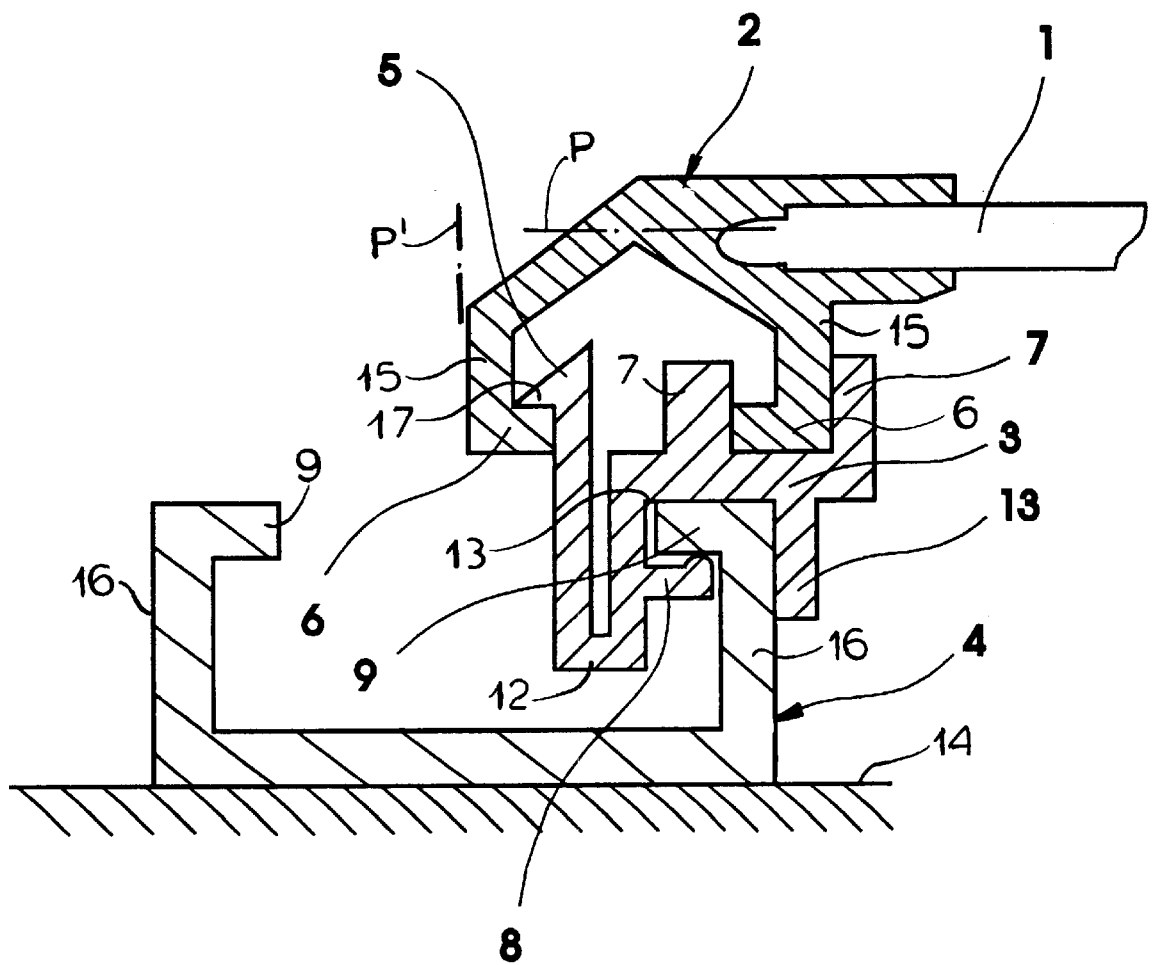
FIG. 1 is a cross section through a panel edge and mounting assembly in accordance with the invention.

As seen in FIG. 1 a solar panel 1 lying in a generally horizontal plane P is provided along its straight edges with a frame or edge molding 2 that is joined by a mounting profile 3 to a strip or roof profile 4 fixed to a roof surface 14. The edge molding 2 is of downwardly open C-section and has a pair of parallel longitudinally extending inner and outer legs 15 each having at its lower edge a short inwardly directed lip 6. Similarly the profile 4 is of upwardly open U-section having a pair of parallel longitudinally extending inner and outer arms 16 whose outer edges are provided with short inwardly directed lips 9.

The connecting profile 3 according to the invention is formed of one piece with a pair of longitudinally extending and upwardly directed inner and outer arms 7 between which the inner leg 15 is captured with its lip 6. It also has a pair of downwardly directed longitudinally extending inner and outer legs 13 fitted over the inner arm 16 with its lip 9. The outer leg 13 is formed with an inwardly directed longitudinally extending tab 8 that engages under the captured lip 9 and holds the profile 3 down on the profile 4. An upwardly and longitudinally extending rib 5 of the profile 3 carrying an outwardly directed tooth or barb 17 has a lower end joined by a web 12 to a lower end of the leg 13 carrying the tab 8. The barb 17 engages over the lip 6 of the outer leg 15 of the edge molding 2 to hold the edge molding 2 and panel 1 down on the profile 3. The profile 3 is formed of a material, e.g. a weather-resistant plastic, that is at least limitedly elastically deformable.

Thus with the system of this invention the roof profiles 4 are first secured in place. Then the profiles 3 are fitted to them by hooking the tab 8 under the lip 9 and rocking them outward until they assume the illustrated position. To this end the spacing between the confronting inner faces of the legs 13 is somewhat greater than the width of the upper end of the arm 16 including its lip 9. Thereafter the panel 1 is pressed down so its outer leg 15 and lip 6 inwardly deflect the upper end of the rib 5 until the barb 17 can snap into place behind the outer lip 6, whereupon the panel 1 is solidly mounted. Before installing the panel 1, another such profile 3 could be mounted on the other arm 16 of the roof profile 4 to carry the edge of another such panel 1.

Figure 2:
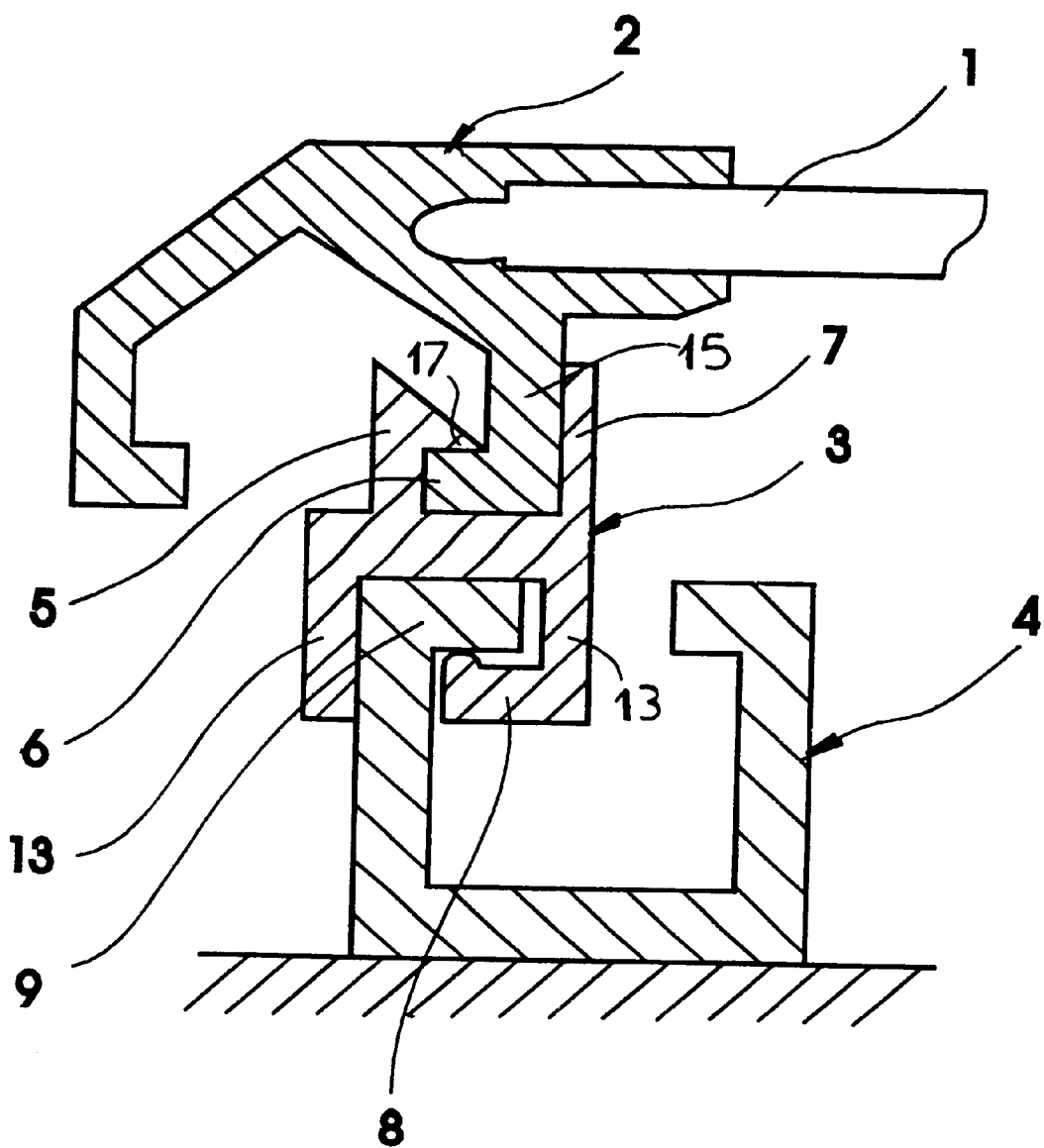
FIGS. 2 through 5 are views like FIG. 1 of various other systems according to the invention.

In FIG. 2 there is no inner abutment arm 7. The rib 5 carrying the retaining barb 17 serves as an outer abutment in its place. Here therefore only the inner leg 15 of the roof profile 4 is used for mounting the panel 1 whereas in FIG. 1 the inner leg 15 is used for stabilizing the panel 1 parallel to the roof surface 14 while the outer leg 15 is used for stabilizing the panel 1 against movement perpendicular to the surface 14.

Figure 3:
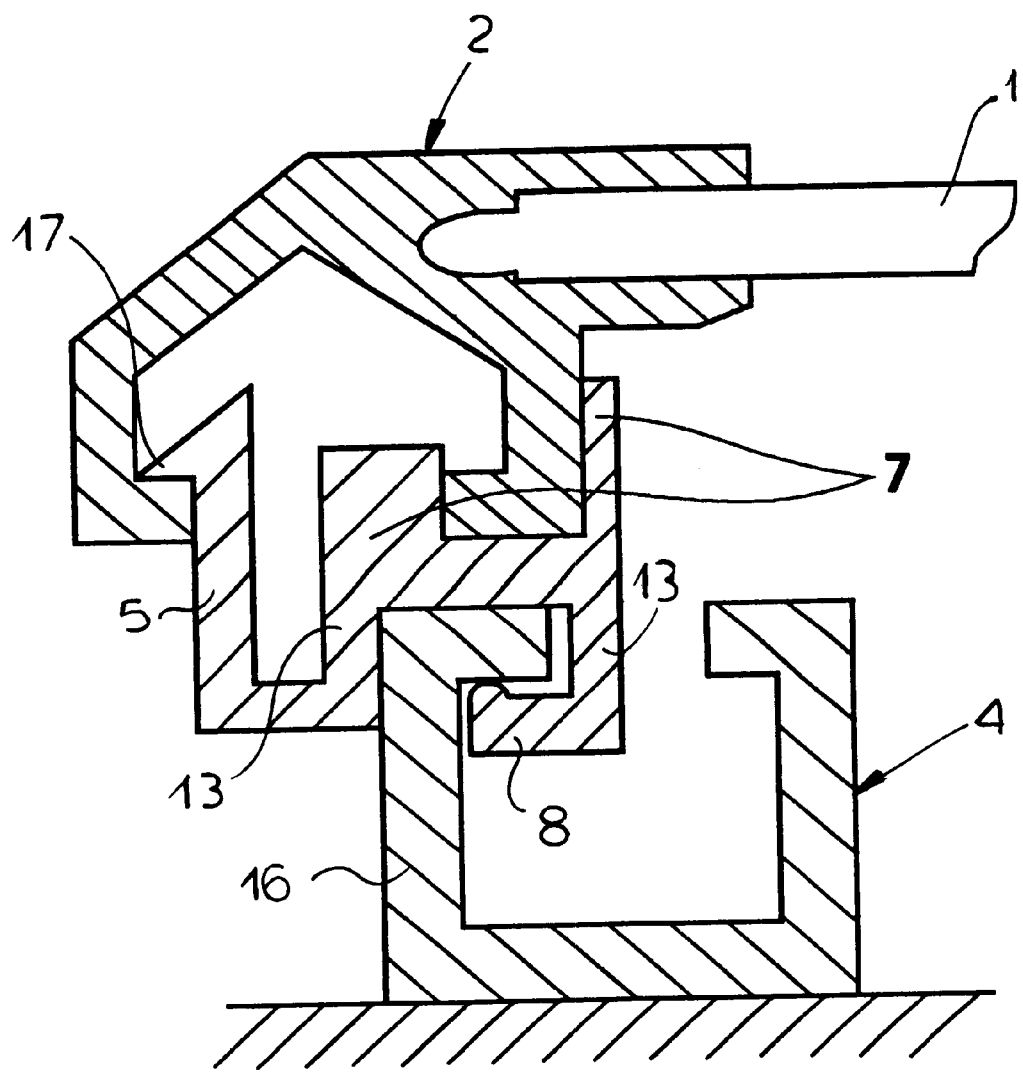

FIG. 3 shows an arrangement quite similar to that of FIG. 1, except that the tab 8 is carried on the inner leg 13 rather than the outer leg 13 so that the system can be clipped over the outer arm 16 of the profile 4.

Figure 4:
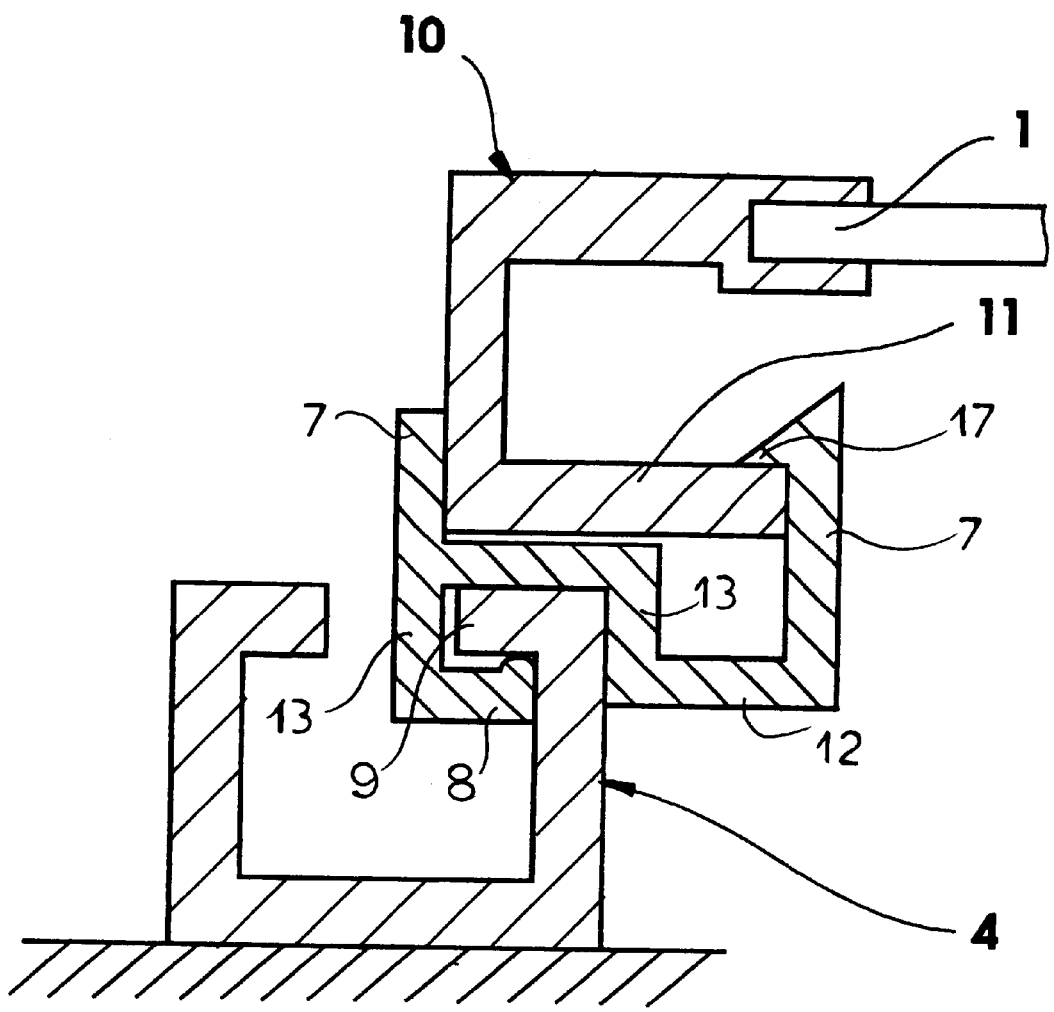

A much simpler arrangement is shown in FIG. 4. Here the panel 1 has an edge profile molding 10 of inwardly open C-section with horizontal arms upper and lower 11. The lower arm 11 is captured between the arms 7, the inner one of which has an upper edge provided with the barb 17 and a lower edge connected via the web 12 to a lower edge of the inner leg 13.

Figure 5:
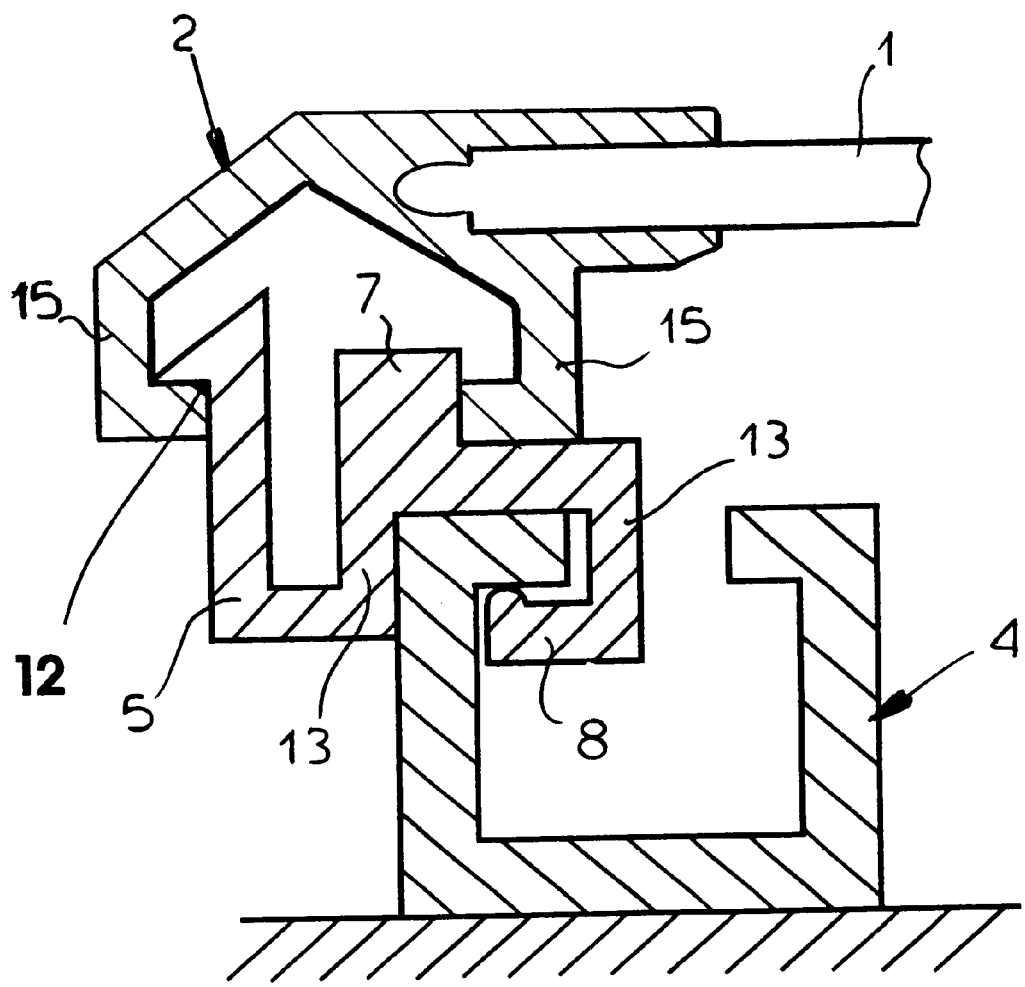

In FIG. 5 the arrangement is identical to that of FIG. 3, except that there is no inner arm 7. Since, however, the outer edge of the inner leg 15 bears outward against the outer arm 7 of the profile 3 and the inner edge of the outer leg 15 bears inward against the retaining rib 5, the panel 1 is solidly held in place.

In the arrangements of FIGS. 1 and 4 it is clearly possible to mount two solar-panel edges on the same roof profile 4. To this end the edge molding 2 and mounting profile 3 are dimensioned such that they do not extend past a center plane P' (FIG. 1) to which the roof profile 4 is symmetrical.

I claim:

1. In combination:
    a solar panel lying in a plane and having a profiled edge molding;
    an elongated roof profile juxtaposed with the edge molding and having at least one elongated arm transverse to the plane and having an upper edge provided with a short lip generally parallel to the plane; and
    a mounting profile between the edge molding and roof profile and formed with
        formations engaging the roof profile and preventing movement of the mounting profile relative thereto generally parallel to the plane,
        formations engaging the roof profile and preventing movement of the mounting profile relative thereto transverse to the plane,
        formations engaging the edge molding and preventing movement of the mounting profile relative thereto generally parallel to the plane, and
        formations engaging the short lip of the arm of the edge molding and preventing movement of the mounting profile relative to the edge molding transverse to the plane.

2. The solar-panel mounting system defined in claim 1 wherein the formations preventing movement of the mounting profile relative to the roof profile generally parallel to the plane include a pair of arms projecting downward from the mounting profile and embracing the one arm of the roof profile.

3. The solar-panel mounting system defined in claim 2 wherein the formations preventing movement of the mounting profile relative to the roof profile transverse to the plane include a tab projecting from one of retaining-profile arms and engaging underneath the short lip of the roof-profile arm.

4. In combination:
    an elongated roof profile;
    a solar panel lying in a plane and having a profiled edge molding juxtaposed with the roof profile and having at least one elongated leg extending transverse to the plane and having a lower edge provided with a short lip extending generally parallel to the plane; and
    a mounting profile between the edge molding and roof profile and formed with
        formations engaging the roof profile and preventing movement of the mounting profile relative thereto generally parallel to the plane,
        formations engaging the roof profile and preventing movement of the mounting profile relative thereto transverse to the plane,
        formations engaging the edge molding, preventing movement of the mounting profile relative thereto generally parallel to the plane, and including a pair of parallel and upwardly directed arms at least one of which engages the edge-molding leg, and
        formations engaging the edge molding and preventing movement of the mounting profile relative thereto transverse to the plane.

5. The solar-panel mounting system defined in claim 4 wherein one of the retaining-profile arms is formed with a lip directed generally parallel to the plane, engaged behind the lip of the edge-molding leg, and constituting the formation preventing movement of the mounting profile relative to the edge molding transverse to the plane.

6. In combination:
    an elongated roof profile;
    a solar panel lying in a plane and having a profiled edge molding juxtaposed with the roof profile and having at least one elongated leg extending transverse to the plane and having a lower edge provided with a short lip extending generally parallel to the plane; and
    a mounting profile between the edge molding and roof profile and formed with
        formations engaging the roof profile and preventing movement of the mounting profile relative thereto generally parallel to the plane,
        formations engaging the roof profile and preventing movement of the mounting profile relative thereto transverse to the plane, formations engaging the edge molding, preventing movement of the mounting profile relative thereto generally parallel to the plane, and including a pair of parallel and upwardly directed arms flanking and capturing the edge-molding leg, and formations engaging the edge molding and preventing movement of the mounting profile relative thereto transverse to the plane.

7. In combination:

an elongated roof profile;

a solar panel lying in a plane and having a profiled edge molding juxtaposed with the roof panel and having at least one elongated leg extending transverse to the plane and having a lower edge provided with a short lip extending generally parallel to the plane and another such elongated leg transverse to the plane and having a lower edge provided with a short lip extending generally parallel to the plane; and a mounting profile between the edge molding and roof profile and formed with formations engaging the roof profile and preventing movement of the mounting profile relative thereto generally parallel to the plane, formations engaging the roof profile and preventing movement of the mounting profile relative thereto transverse to the plane, formations engaging the edge molding and preventing movement of the mounting profile relative thereto generally parallel to the plane, and formations engaging the edge molding and preventing movement of the mounting profile relative thereto transverse to the plane, an elastically deflectable elongated rib extending transverse to the plane and having an outer edge formed with a barb engaged behind one of the lips of the edge molding and constituting the formation preventing movement of the mounting profile relative to the edge molding transverse to the plane.

* * * * *